United States Patent
Pussell

(10) Patent No.: US 8,201,553 B2
(45) Date of Patent: Jun. 19, 2012

(54) SOLAR HOT WATER SYSTEM AND METHOD OF OPERATING A SOLAR HOT WATER SYSTEM

(75) Inventor: Patrick Pussell, Pyrmont (AU)

(73) Assignee: Dux Manufacturing Limited, Moss Vale (AU)

( * ) Notice: Subject to any disclaimer, the term of this patent is extended or adjusted under 35 U.S.C. 154(b) by 138 days.

(21) Appl. No.: 12/681,620

(22) PCT Filed: Oct. 3, 2008

(86) PCT No.: PCT/AU2008/001476
§ 371 (c)(1),
(2), (4) Date: Apr. 4, 2010

(87) PCT Pub. No.: WO2009/043113
PCT Pub. Date: Apr. 9, 2009

(65) Prior Publication Data
US 2010/0224182 A1    Sep. 9, 2010

(30) Foreign Application Priority Data
Oct. 3, 2007  (AU) .............................. 2007905405

(51) Int. Cl.
*F24J 2/00* (2006.01)
(52) U.S. Cl. .................. 126/585; 126/640; 137/876
(58) Field of Classification Search .................. 126/572, 126/585, 586, 587, 589, 595, 596, 597, 640; 137/625.46, 625.47, 876
See application file for complete search history.

(56) References Cited

U.S. PATENT DOCUMENTS

| 4,454,890 A | 6/1984 | Schoenheimer et al. |
| 4,644,935 A | 2/1987 | Gallagher |
| 5,356,211 A * | 10/1994 | Fritsch ....................... 303/119.2 |
| 6,253,791 B1 | 7/2001 | Miklo |
| 2005/0189025 A1 | 9/2005 | Chszaniecki |
| 2007/0214815 A1* | 9/2007 | Lewkowitz et al. .......... 62/235.1 |

FOREIGN PATENT DOCUMENTS

| DE | 202006002375 U1 | 4/2006 |
| GB | 2137735 A | 10/1984 |
| GB | 2177495 A | 1/1987 |
| JP | 56-110844 A | 9/1981 |
| JP | 57-012254 A | 1/1982 |
| JP | 57-019548 A | 2/1982 |

* cited by examiner

Primary Examiner — Alfred Basichas
(74) Attorney, Agent, or Firm — Baker & Hostetler LLP

(57) ABSTRACT

A solar hot water system is provided, comprising an ambient temperature sensor, a controller, a valve, a water storage tank, having an inlet and an outlet, and at least a first solar panel, having an inlet in fluid communication with the water storage tank outlet and an outlet in fluid communication with the water storage tank inlet. When the temperature sensor indicates to the controller that the ambient temperature is above a predetermined level, the controller controls the valve to direct flow from the water storage tank outlet to the solar panel inlet and from the solar panel outlet to the water storage tank inlet. When the temperature sensor indicates to the controller that the ambient temperature is below a predetermined level, the controller controls the valve to direct flow from the solar panel inlet to the valve and so to atmosphere.

13 Claims, 5 Drawing Sheets

SOLAR HOT WATER SYSTEM AND METHOD OF OPERATING A SOLAR HOT WATER SYSTEM

CROSS-REFERENCE TO RELATED APPLICATIONS

This application is a National Stage of International Patent Application No. PCT/AU2008/001476, filed on Oct. 3, 2008, which claims priority to foreign Patent Application No. AU 2007905405, filed on Oct. 3, 2007.

FIELD OF THE INVENTION

The present invention relates to a solar hot water system, a method of operating a solar hot water system and a valve for use in a solar hot water system.

The present invention has been primarily developed for use in a preventing damage to solar panels in domestic solar hot water systems and will be described hereinafter with reference to that application. However, the invention is not limited to this particular use, and is also applicable to commercial installations, which often use a large number of solar panels.

BACKGROUND OF THE INVENTION

A problem associated with solar hot water systems is, if the ambient temperature falls below about 6° C., the liquid in the solar panels can expand and thus damage the panels.

To prevent this occurring, one known arrangement involves the use of a heated water storage tank that has an additional storage tank in its interior, the interior storage tank containing water, glycol or another liquid anti-freezing agent. The interior storage tank is in a heat exchanging relationship with the heated water storage tank. A pump is used to drive the fluid into one or more solar panels, where it undergoes heating, and then back to the interior storage tank for heating of the water in the water storage tank. If the ambient temperature falls to about 6° C., the fluid in the solar panels is drained into the interior storage tank. This is known as the "drain-back" method and has several disadvantages. Firstly, it is a complicated and expensive arrangement to manufacture and install, particularly the requirement for the separate interior tank within the water storage tank. Further, when using a liquid other than potable water or a (relatively expensive) food-grade anti-freezing agent, then the interior tank must be of double walled construction. This adds to complexity and cost. Secondly, heat transfer from the fluid to the water is via the tank walls, which is relatively inefficient. Thirdly, the interior tank must be larger than is required for normal operation, in order to be able to store the volume of the emptied solar panel(s), which increases the size of the water storage tank, and thus the system overall. Fourthly, the pump required is relatively expensive as it must be able to lift the fluid against the pressure head in order to refill the solar panels.

Another known arrangement involves circulating glycol, or another liquid anti-freezing agent, from one or more solar panels to one side of a heat exchanger. The other side of the heat exchanger is connected to water circulated from a hot water storage tank. The glycol prevents the panels from being damaged when the temperature falls to below about 6° C. Whilst this arrangement avoids the complicated dual tank arrangement required for the drain-back method, it nonetheless has disadvantages. Firstly, it is also relatively complicated and expensive to manufacture and install. For example, the entire system must be bled of any air, pressurised and then sealed prior to operation. Secondly, the heat transfer between the glycol and the water circuits, through the heat exchanger, is relatively inefficient.

A third known arrangement, known as a recirculating system, uses a solar panel and a heated water storage tank connected in series. In this arrangement, when the temperature falls to about 6° C., a pump is activated to recirculate heated water from the heated water storage tank through the panels to keep them above a temperature where damage will occur. A disadvantage of this arrangement is that some of the energy imparted to the water from the Sun is lost when that heated water is used to warm the panels, which reduces energy efficiency. This arrangement can also utilise a temperature sensitive frost valve that opens when the ambient temperature gets to about 6° C. to drain water from the solar panel back. The draining water also warms the valve which then closes. The disadvantages of this arrangement are, firstly, the additional cost of the valve and increased installation complexity. Secondly, the valve is also prone to blocking and other failure, and has a slow reaction time which may not prevent damage during snap freezing. Thirdly, successful operation is dependant on unimpeded flow in the solar panels and associated pipework.

SUMMARY OF THE INVENTION

Accordingly, in a first aspect, the present invention provides a solar hot water system comprising:
an ambient temperature sensor;
a controller;
a valve;
a water storage tank having an inlet and an outlet; and
at least a first solar panel having an inlet in fluid communication with the water storage tank outlet and an outlet in fluid communication with the water storage tank inlet,
wherein, when the temperature sensor indicates to the controller that the ambient temperature is above a predetermined level, the controller controls the valve to direct flow from the water storage tank outlet to the solar panel inlet and from the solar panel outlet to the water storage tank inlet, and
when the temperature sensor indicates to the controller that the ambient temperature is below a predetermined level, the controller controls the valve to direct flow from the solar panel inlet to the valve and so to atmosphere.

The system preferably includes a pump adapted to circulate fluid between the tank and the solar panel, most preferably a pump having an inlet in fluid communication with the water storage tank outlet and an outlet in fluid communication with the valve.

The valve is preferably lower than the solar panel inlet and the flow from the solar panel inlet to the valve and so to atmosphere is preferably under the influence of gravity.

The system preferably includes second solar panel having an inlet in fluid communication with the first solar panel outlet and an outlet in fluid communication with the water storage tank inlet.

The valve preferably includes a first port, a second port and a third port and is controllable to divert flow from the first port to the second port or from the second port to the third port.

When the temperature sensor indicates to the controller that the ambient temperature is above a predetermined level, the controller controls the valve to direct flow from the valve first port to the valve second port, thereby directing water to flow from the water storage tank outlet to the solar panel inlet and from the solar panel outlet to the water storage tank inlet, and when the temperature sensor indicates to the controller that the ambient temperature is below a predetermined level, the controller preferably controls the valve to direct flow from the valve second port to the valve third port, thereby directing water to drain from the solar panel inlet to the valve third port.

In a second aspect, the present invention provides a method of operating a solar hot water system, the system comprising:
a water storage tank having an outlet an inlet; and
at least a first solar panel having an inlet in fluid communication with the water storage tank outlet and an outlet in fluid communication with the water storage tank inlet,
the method comprising monitoring ambient temperature and, when the ambient temperature is above a predetermined level, directing water from the water storage tank outlet to the solar panel inlet and from the solar panel outlet to the water storage tank inlet, and when the ambient temperature is below a predetermined level, draining water from the solar panel inlet.

The system preferably also includes:
an ambient temperature sensor;
a controller; and
a valve including a first port, a second port and a third drain port, the valve controllable to divert flow from the first port to the second port or from the second port to the third port,
and the method preferably includes:
when the temperature sensor indicates to the controller that the ambient temperature is above a predetermined level, the controller controlling the valve to direct flow from the valve first port to the valve second port, thereby driving water from the water storage outlet to the solar panel inlet and from the solar panel outlet to the water storage inlet, and
when the temperature sensor indicates to the controller that the ambient temperature is below a predetermined level, the controller controlling the valve to direct flow from the valve second port to the valve third port, thereby allowing water to drain from the solar panel inlet to the valve third port.

In a third aspect, the present invention provides a valve comprising:
a valve body having a first port, a second port and a third port;
a valve-member, within the body, and controllable to open a first fluid communication path between the first port and the second port and a second fluid communication path the second port and the third port,
wherein the first fluid communication path closes before second fluid communication path opens and vice versa.

The valve member preferably includes a substantially spherical valve formation. The valve member is preferably undergoes pivotable movement, most preferably 90° or 180°, between the first fluid communication path and the second fluid communication paths.

In one form, the first fluid communication path is preferably defined by an internal passage, most preferably an axial bore, in the valve member. The second fluid communication path is preferably defined by an external recess on the valve member.

In another form, the first and second fluid communication paths are preferably defined by an internal passage, most preferably right angled, in the valve member.

BRIEF DESCRIPTION OF THE DRAWINGS

Preferred embodiments of the present invention will now be described, by way of examples only, with reference to the accompanying drawings wherein.

DETAILED DESCRIPTION OF THE PREFERRED EMBODIMENTS

Figure 1:
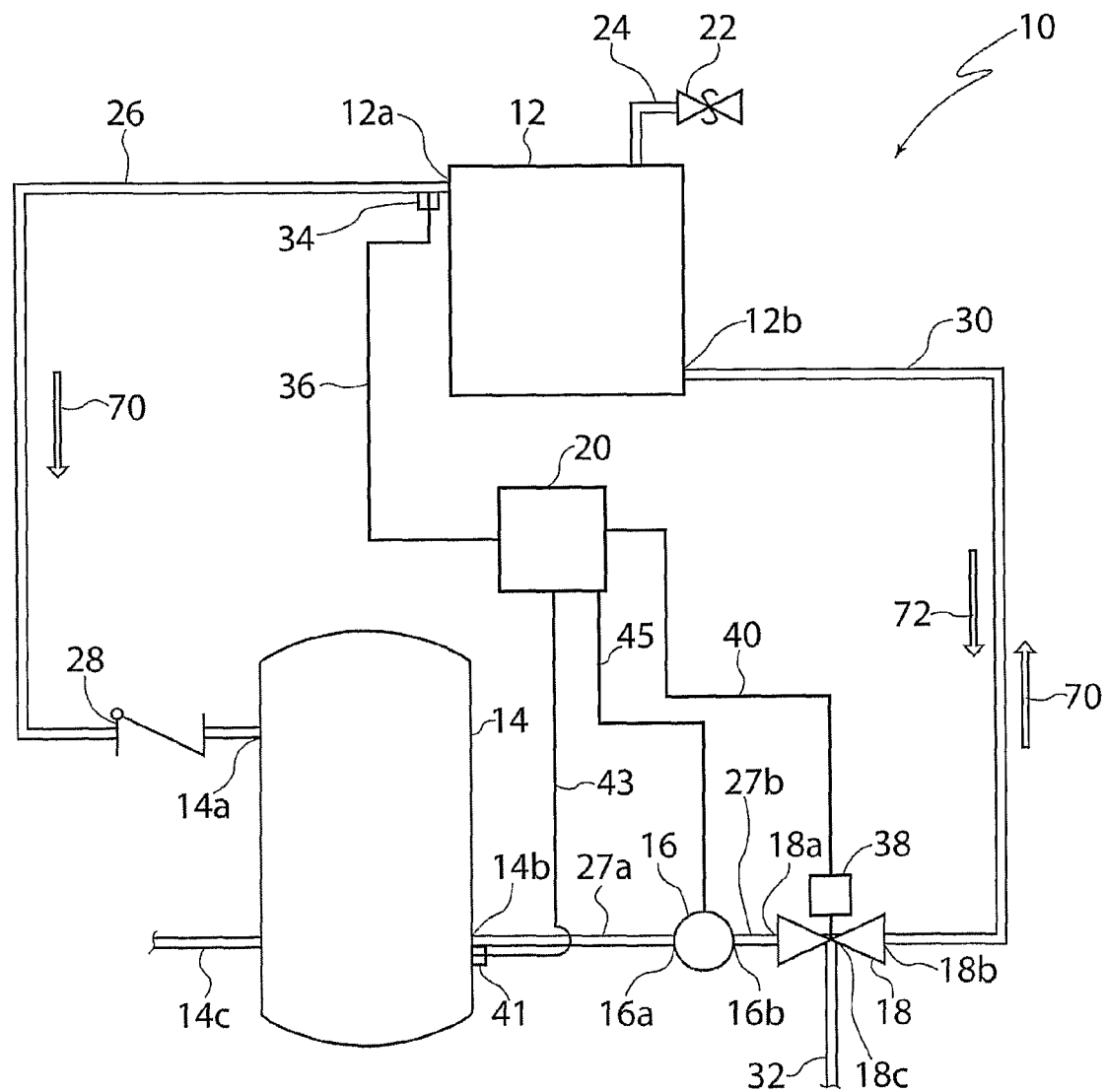
FIG. 1 is a schematic view of a first embodiment of a hot water system.

FIG. 1 shows a first embodiment of a solar hot water system indicated generally by the reference numeral 10. The system 10 includes a solar panel 12, a heated water storage tank 14, a pump 16, a valve 18, and a controller 20.

The interior of the solar panel 12 is connected to an air bleed valve 22 by an air pipe 24. The solar panel 12 also includes an outlet 12a connected to a first inlet 14a of the tank 14 by a water pipe 26. The pipe 26 includes a one-way valve 28 therein. The tank 14 also includes an outlet 14b, connected to an inlet 16a of the pump 16 by a water pipe 27a, and a second, mains water supply, inlet 14c. The pump 16 also includes an outlet 16b connected to a first port 18a of the valve 18 by a water pipe 27b. The valve 18 also has a second port 18b, which is connected to an inlet 12b of the solar panel 12 by a water pipe 30. The valve 18 also has a third (drain) port 18c, which is connected to atmosphere by water drain pipe 32. The valve 18 is positioned below the inlet 12b of the solar panel 12.

The controller 20 is connected to a first (ambient) temperature sensor 34 by a cable 36. The controller 20 is connected to a motor 38, (or other actuator) associated with the valve 18, by a cable 40. The controller 20 is connected to a second temperature sensor 41, at the tank outlet 14b, by a cable 43. The controller 20 is also connected to the pump 16 by a cable 45.

Figure 3:
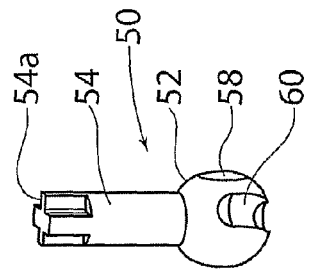
FIG. 3 is a perspective view of a valve member used in the valve shown in FIG. 2.

The valve 18 will now be described in more detail with reference to FIGS. 2 to 9. FIG. 3 shows a stainless steel internal valve member 50 which forms part of the valve 18. The valve member 50 has a substantially spherical end formation 52, and a cylindrical drive shaft 54, which has an engagement formation 54a. The engagement formation 54a is suitable for connecting the valve member 50 to the motor 38 so that the valve member 50 can be pivoted with respect to a valve housing 56.

Figure 5:
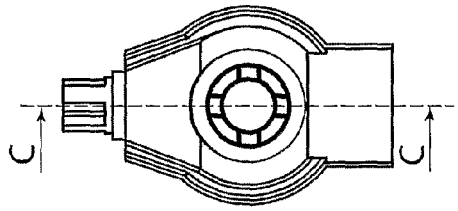
FIG. 5 is a cross-sectional view of the valve shown in FIG. 4 along the line A-A.
Figure 2:
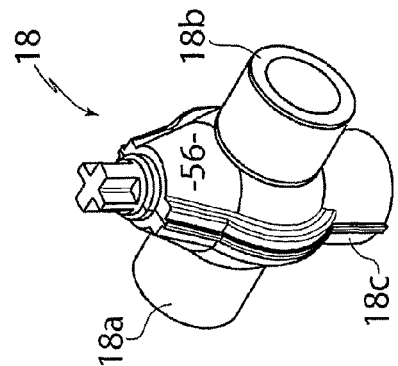
FIG. 2 is a perspective view of an embodiment of a valve used in the system shown in FIG. 1.
Figure 9:
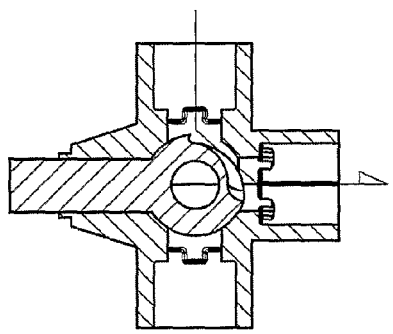
FIG. 9 is a cross-sectional side view of the valve shown in FIG. 8 along line C-C.
Figure 7:
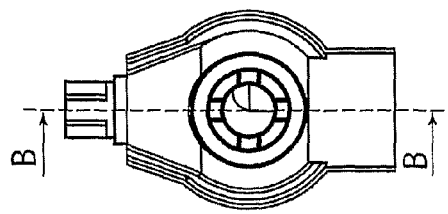
FIG. 7 is a cross-sectional view of the valve shown in FIG. 6 along line D-B.

The valve formation 52 has a cylindrical internal passage 58 and an external arcuate recess 60. The longitudinal axis of the passage 58 is angled at 45° to the longitudinal axis of the recess 60. As best shown in FIGS. 5, 7 and 9, the first, second and third ports 18a, 18b and 18c are all in the form of cylindrical spigots that each communicate with a central substantially circular recess 62 within the housing 56.

Figure 4:
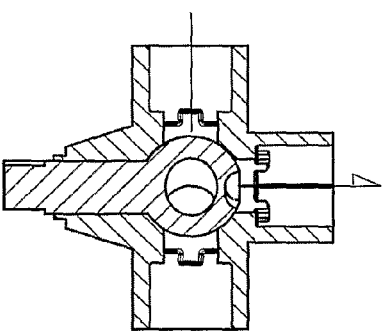
FIG. 4 is an end view of the valve shown in FIG. 2 with the valve member in one of two end positions.
Figure 8:
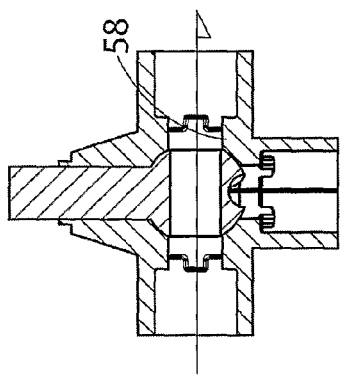
FIG. 8 is an end view of the valve shown in FIG. 2 with the valve member at an intermediate position between the two end positions shown in FIG. 4 and FIG. 6.
Figure 6:
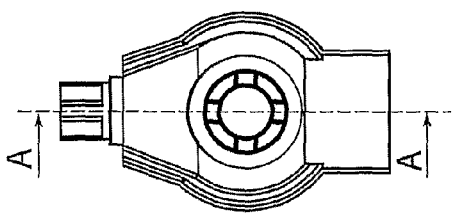
FIG. 6 is an end view of the valve shown in FIG. 2 with the valve member in the other of the two end positions.

FIGS. 4 and 5 show the valve member 50 in the first of two end positions in which the passage 58 provides a first fluid communication path between the first port 18a and the second port 18b. FIGS. 6 and 7 show the valve member 50 pivoted through 90° from the position shown in FIGS. 4 and 5 to the second of the two end positions. In the second position, the recess 60 establishes a second fluid communication path between the second port 18b and the third port 18c. FIGS. 8 and 9 show the valve member 50 pivoted through 45 degree from each of the end positions shown in FIGS. 4 and 5 and FIGS. 6 and 7 respectively and demonstrates that the first fluid communication path is fully closed before the second fluid communication path begins to open and vice versa. This closure prevents mains water pressure at the first port 18a or the second port 18b escaping through the third port 18c during movement of the valve member 50 between the first and second end positions shown in FIGS. 4 and 5 and FIGS. 6 and 7 respectively.

The operation of the hot water system 10 shall now be described with reference to FIG. 1. If the temperature sensor 34 indicates to the controller 20 that the ambient temperature is above about 6° C., then the controller 20 actuates the motor 38 to position the valve member 50 in the first end position to establish the first fluid communication path between the first port 18a and the second port 18b. If the controller also receives signals indicating that solar energy is available (i.e. the temperature at the sensor 34 is more than 4 to 6° C. higher than at the sensor 41), then the controller 20 also energises the pump 16. This causes water to circulate from the outlet 14b of the tank 14 to the inlet 12b of the solar panel 12. The water in the solar panel 14 is then heated by the Sun's rays. The heated water is then pumped to the outlet 12a of the solar panel 12 to the first inlet 14a of the tank 14. This circulation is indicated by arrows 70. Heated water can then be drawn from the tank 14 for use. The water level in the tank 14 is replenished by the mains supply connected at second inlet 14c.

If the temperature sensor 34 indicates to the controller 20 that the ambient temperature is above about 6° C. but solar energy is not available (i.e. the temperature at the sensor 34 is less than 4 to 6° C. higher than at the sensor 41), then the controller 20 de-energises the pump 16 and positions (or leaves) the valve member 50 in the first end position (as shown in FIGS. 4 and 5) with the first fluid communication path established between the first port 18a and the second port 18b.

Regardless of whether or not solar energy is not available, if the temperature sensor 34 indicates to the controller 20 that the ambient temperature has fallen below about 6° C., the controller 20 controls the motor 38 to drive the valve member 50 to the second end position (as shown in FIGS. 6 and 7) to establish the second fluid communication path between the second port 18b and the third port 18c. If it has not already done so, the controller 20 also turns off the pump 16. As the valve 18 is positioned below the inlet 12b of the solar panel 12, water in the solar panel 12 drains under the influence of gravity through the pipe 30 to the second port 18b and then from the third port 18c to atmosphere via the pipe 32. The emptying process only takes about 3 to 4 minutes, during which time the solar panel inlet 12b acts as an outlet. This emptying flow is indicated by arrow 72. The empty solar panel 12 is thus prevented from being damaged as it does not contain any water able to expand.

If the sensor 34 later indicates to the controller 20 that the ambient temperature has risen above 6° C., then the controller energises the motor 38 to drive the valve member 50 to the first end position (as shown in FIGS. 4 and 5). If solar energy is also available, then the controller also activates the pump 16. This causes the solar panel 12 to fill with water from the tank 14 and then begin circulating that water in the manner previously described. During this filling process, air in the (previously empty) solar panel 12 escapes via the automatic air bleed valve 22.

The system 10 has several advantages. Firstly, it utilises a standard water storage tank which reduces manufacturing and installation complexity and cost. Secondly, it is suitable for retro fitting to existing (gas or electric) hot water systems. Thirdly, it utilises potable water in all components and thus avoids the use of (relatively expensive and hazardous) glycol or other anti-freeze agents. Fourthly, the system has relatively high energy efficiency due to the direct utilisation of solar heater water (i.e. the avoidance of heat exchangers and the like).

Figure 10:
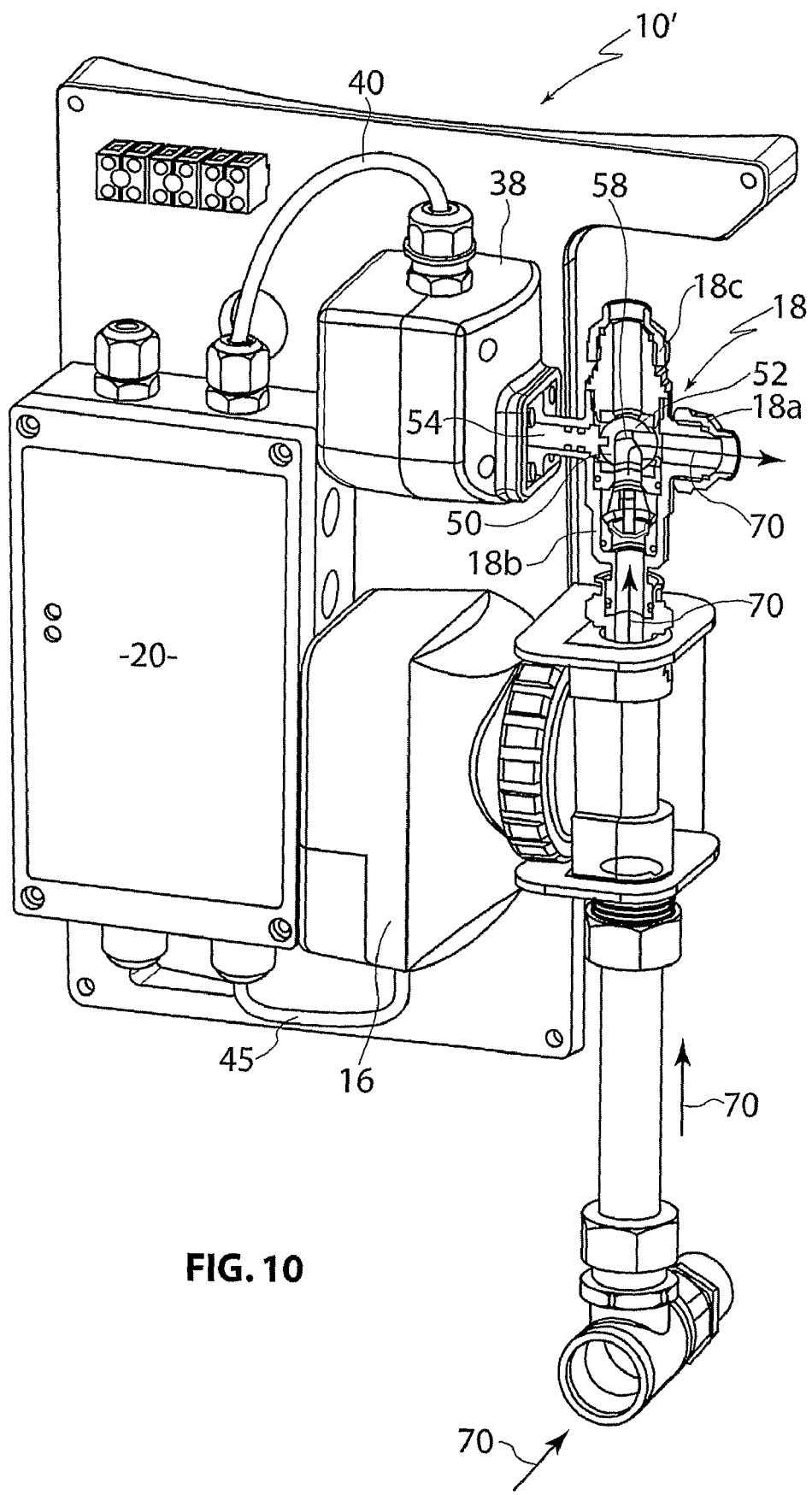
FIG. 10 is a partial perspective view of a second embodiment of a hot water system, during water heating.
Figure 11:
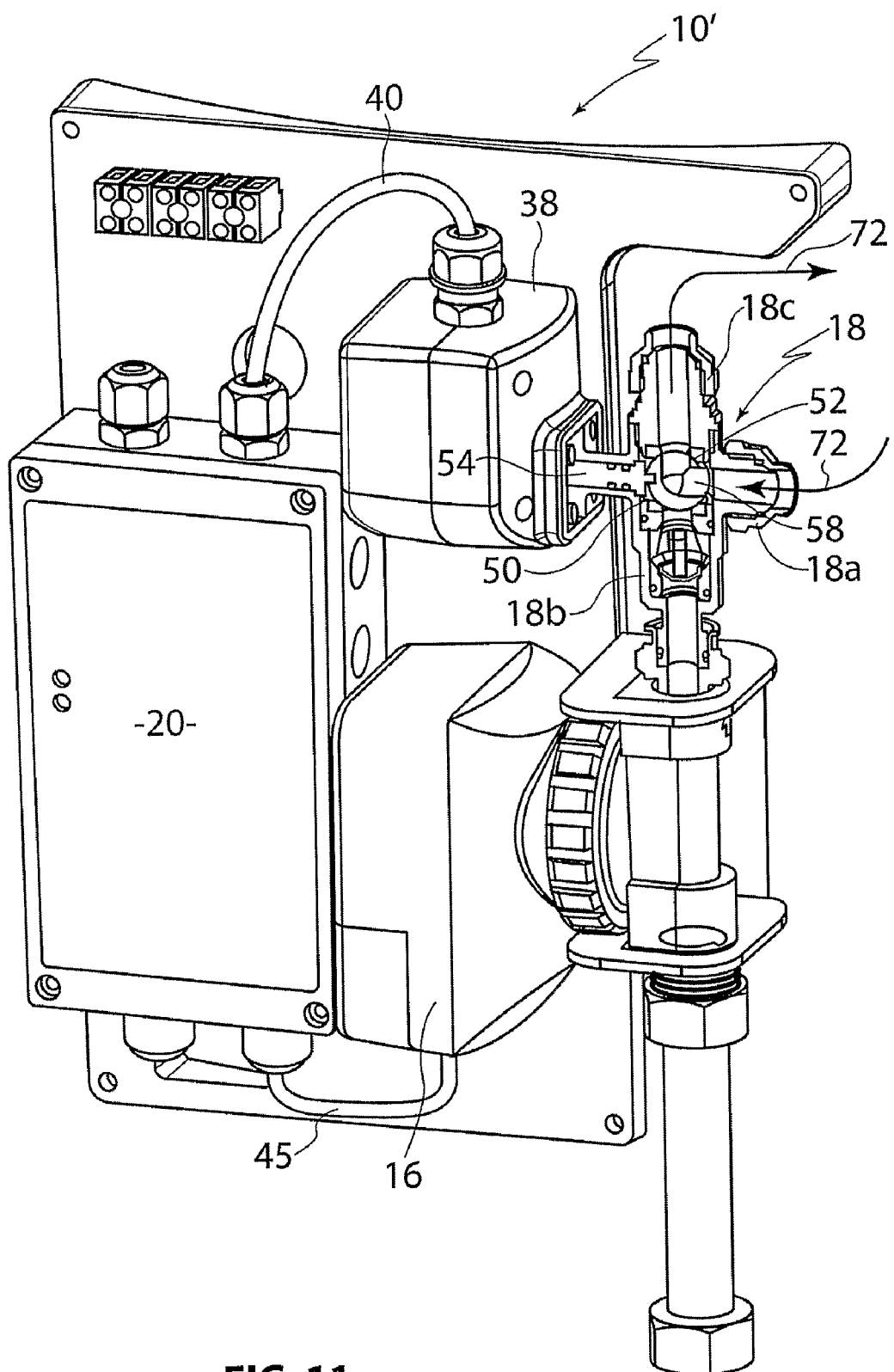
FIG. 11 is a partial perspective view of the water heater shown in FIG. 10 during draining.

FIGS. 10 and 11 partially show a second embodiment of a solar hot water system indicated generally by the reference numeral 10'. Like features to those of the first embodiment shown in FIGS. 1 to 9 are indicated with like reference numerals. The system 10' is similar to the system 10 except the substantially spherical end formation 52 of the internal valve member 50 of the valve 18 has a single right angled internal passage 58 therein. FIG. 10 shows the valve member 50 in the first of two end positions in which the passage 58 provides the first fluid communication path between the first port 18a and the second port 18b. FIG. 11 shows the valve member 50 pivoted through 180° from the position shown in FIG. 10 to the second of the two end positions. In the second position, the passage 58 establishes the second fluid communication path between the second port 18b and the third port 18c.

The operation of the hot water system 10' is similar to that of the first embodiment and shall now be described. With reference to FIG. 10, if the temperature sensor 34 indicates to the controller 20 that the ambient temperature is above about 6° C., then the controller 20 actuates the motor 38 to position the valve member 50 in the first end position to establish the first fluid communication path between the first port 18a and the second port 18b. If the controller also receives signals indicating that solar energy is available (i.e. the temperature at the sensor 34 is more than 4 to 6° C. higher than at the sensor 41), then the controller 20 also energises the pump 16. This causes water to circulate from the outlet 14b of the tank 14 to the inlet 12b of the solar panel 12. The water in the solar panel 14 is then heated by the Sun's rays. The heated water is then pumped to the outlet 12a of the solar panel 12 to the first inlet 14a of the tank 14. This circulation is indicated by arrows 70. Heated water can then be drawn from the tank 14 for use. The water level in the tank 14 is replenished by the mains supply connected at second inlet 14c.

If the temperature sensor 34 indicates to the controller 20 that the ambient temperature is above about 6° C. but solar energy is not available (i.e. the temperature at the sensor 34 is less than 4 to 6° C. higher than at the sensor 41), then the controller 20 de-energises the pump 16 and positions (or leaves) the valve member 50 in the first end position (as shown in FIG. 10) with the first fluid communication path established between the first port 18a and the second port 18b.

Regardless of whether or not solar energy is not available, if the temperature sensor 34 indicates to the controller 20 that the ambient temperature has fallen below about 6° C., the controller 20 controls the motor 38 to drive the valve member 50 to the second end position (as shown in FIG. 11) to establish the second fluid communication path between the second port 18b and the third port 18c. If it has not already done so, the controller 20 also turns off the pump 16. As the valve 18 is positioned below the inlet 12b of the solar panel 12, water in the solar panel 12 drains under the influence of gravity through the pipe 30 to the second port 18b and then from the third port 18c to atmosphere. The emptying process only takes about 3 to 4 minutes, during which time the solar panel inlet 12b acts as an outlet. This emptying flow is indicated by arrow 72. The empty solar panel 12 is thus prevented from being damaged as it does not contain any water able to expand.

If the sensor 34 later indicates to the controller 20 that the ambient temperature has risen above 6° C., then the controller energises the motor 38 to drive the valve member 50 to the first end position (as shown in FIG. 10). If solar energy is also available, then the controller also activates the pump 16. This causes the solar panel 12 to fill with water from the tank 14 and then begin circulating that water in the manner previously described. During this filling process, air in the (previously empty) solar panel 12 escapes via the automatic air bleed valve 22.

Figure 12:
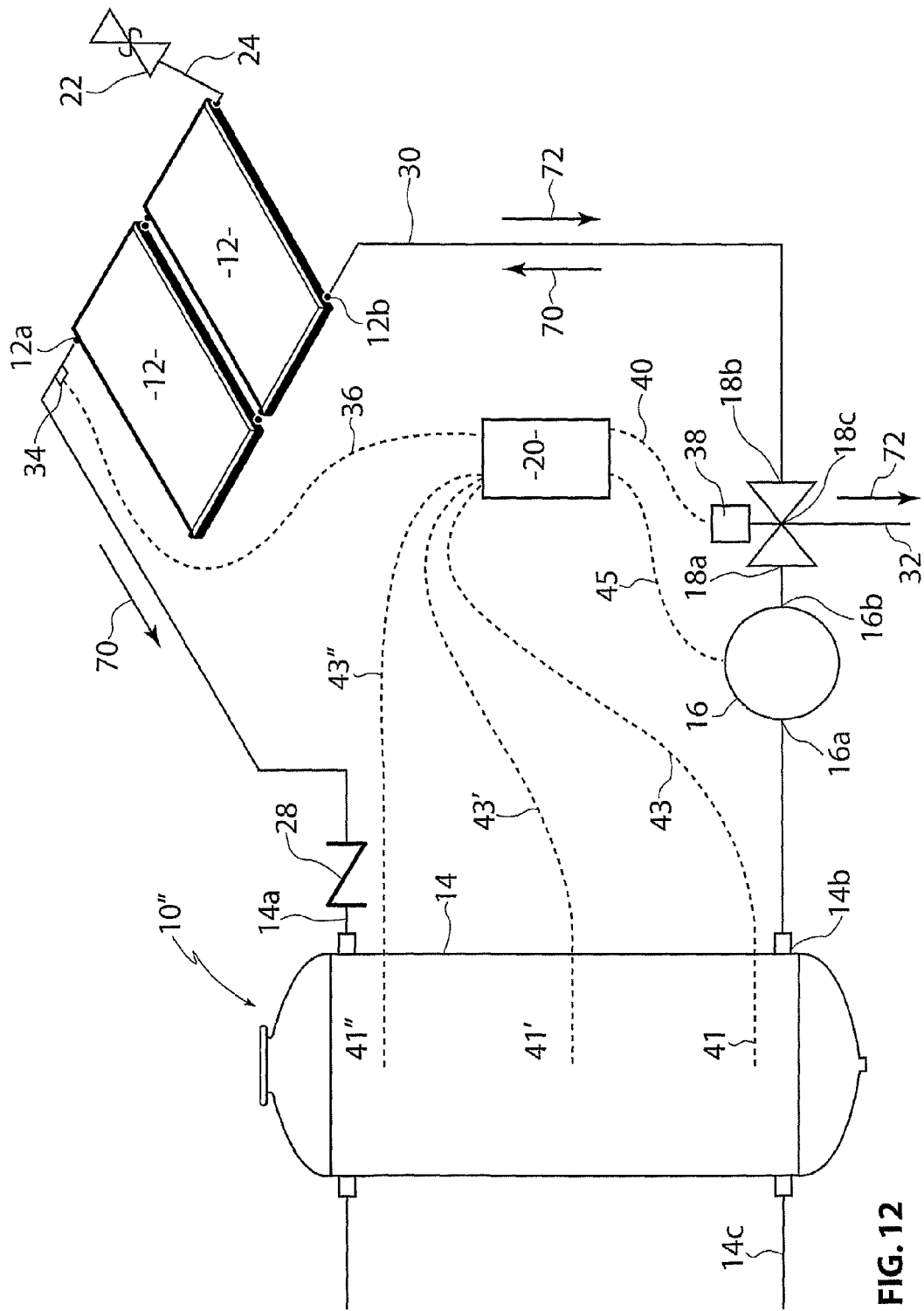
FIG. 12 is a schematic view of a third embodiment of a hot water system.

FIG. 12 shows a third embodiment of a solar hot water system indicated generally by the reference numeral 10". Like features to those of the first embodiment shown in FIGS. 1 to 9 are indicated with like reference numerals. The system 10" is similar to the system 10 except the controller 20 is connected to additional temperature sensors 41' and 41" in the tank 14 by lines 43' and 43" respectively. The operation of the system 10" is the same as was described with reference to the system 10 except, in addition, if the sensors 41, 41' or 41" indicate to the controller 20 that the tank 14 is as hot as it can safely be and the panels 12 are still heating up, then the controller 20 operates the valve 18 to drain the water from the panels 12 (via the flow path indicated by arrows 72) to prevent any over heating of the tank 14.

Although the invention has been described with reference to preferred embodiments, it will be appreciated by persons skilled in the art that the invention can be embodied in many other forms. For example, the mains water supply can alternatively be Tee'd into the tank outlet 14b. Further, the system can operate with more than one solar panel.

The invention claimed is:
1. A solar hot water system, comprising:
an ambient temperature sensor;
a controller;
a valve, including:
a body having a first port, a second port and a third port, and
a member, within the valve body, controllable to open a first fluid communication path between the first port and the second port and a second fluid communication path between the second port and the third port, the first fluid communication path closing before the second fluid communication path opens, and vice versa;
a water storage tank having an inlet and an outlet; and
at least a first solar panel having an inlet in fluid communication with the water storage tank outlet and an outlet in fluid communication with the water storage tank inlet,
wherein, when the temperature sensor indicates to the controller that the ambient temperature is above a predetermined level, the controller controls the valve to direct flow from the first valve port to the second valve port, thereby directing water to flow from the water storage tank outlet to the solar panel inlet and from the solar panel outlet to the water storage tank inlet, and
when the temperature sensor indicates to the controller that the ambient temperature is below a predetermined level, the controller controls the valve to direct flow from the second valve port to the third valve port, thereby directing water to drain from the solar panel inlet to atmosphere.

2. The system as claimed in claim 1, further including a pump adapted to circulate fluid between the tank and the solar panel.

3. The system as claimed in claim 2, wherein the pump has an inlet in fluid communication with the water storage tank outlet and an outlet in fluid communication with the valve.

4. The system as claimed in claim 1, wherein the valve is lower than the solar panel inlet and the flow from the solar panel inlet to the valve and so to atmosphere is under the influence of gravity.

5. The system as claimed in claim 1, wherein the system further includes a second solar panel having an inlet in fluid communication with the first solar panel outlet and an outlet in fluid communication with the water storage tank inlet.

6. The valve as claimed in claim 1, wherein the valve member includes a substantially spherical valve formation.

7. The valve as claimed in claim 1, wherein the valve member undergoes pivotable movement between the first fluid communication path and the second fluid communication path.

8. The valve as claimed in claim 7, wherein the valve member undergoes pivotable movement of 90° or 180° between the first fluid communication path and the second fluid communication path.

9. The valve as claimed in claim 1, wherein the first fluid communication path is defined by an internal passage in the valve member.

10. The valve as claimed in claim 9, wherein the internal passage is a cylindrical bore.

11. The valve as claimed in claim 9, wherein the second fluid communication path is defined by an external recess on the valve member.

12. The valve as claimed in claim 1, wherein the first and second fluid communication paths are defined by an internal passage in the valve member.

13. The valve as claimed in claim 12, wherein the internal passage is right angled.

* * * * *